Aug. 12, 1941.  C. W. MOTT  2,252,349
AGRICULTURAL IMPLEMENT
Filed Jan. 13, 1940  3 Sheets-Sheet 1
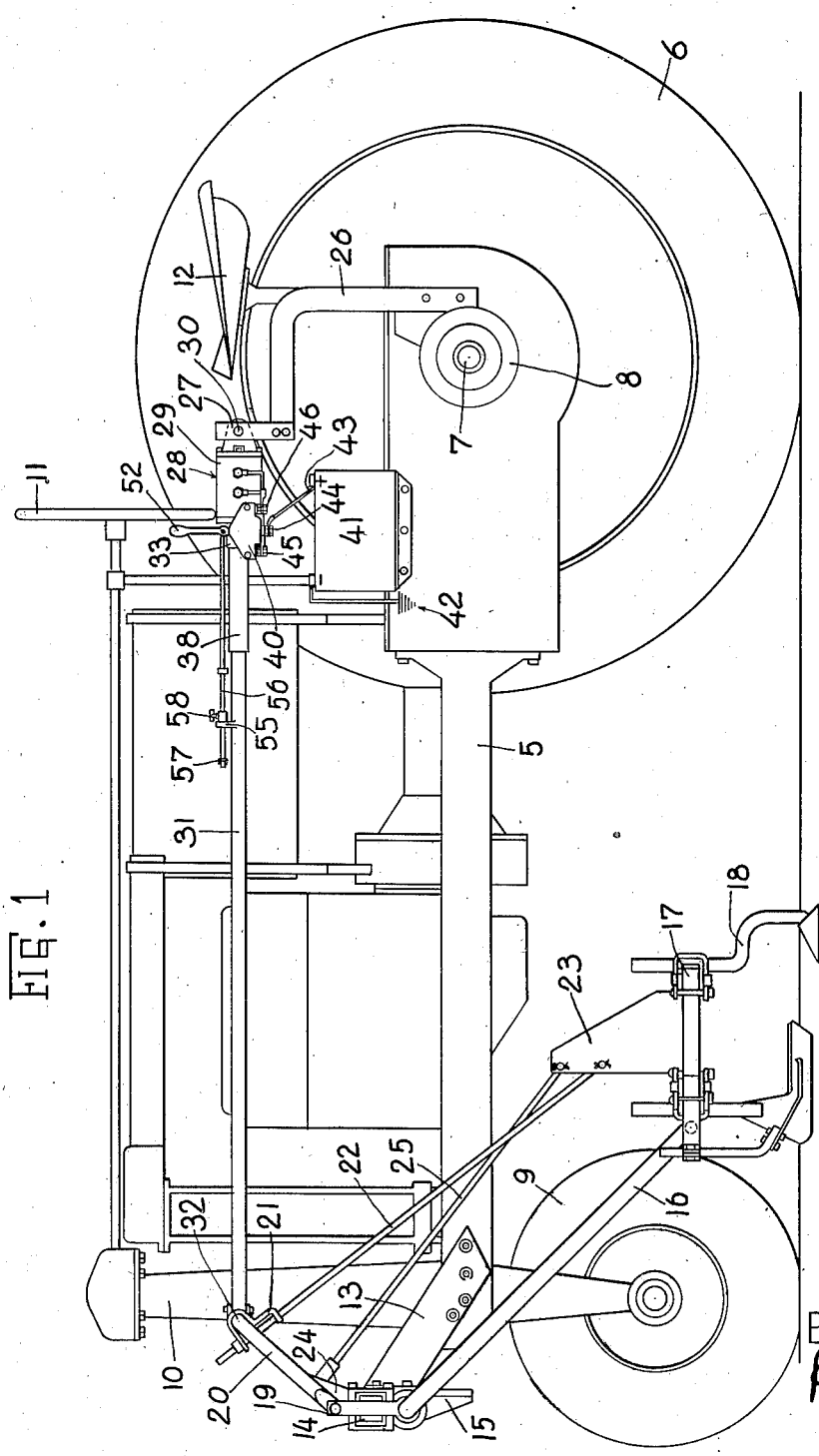
INVENTOR
C. W. MOTT
By
Paul O. Pippel
ATTY.

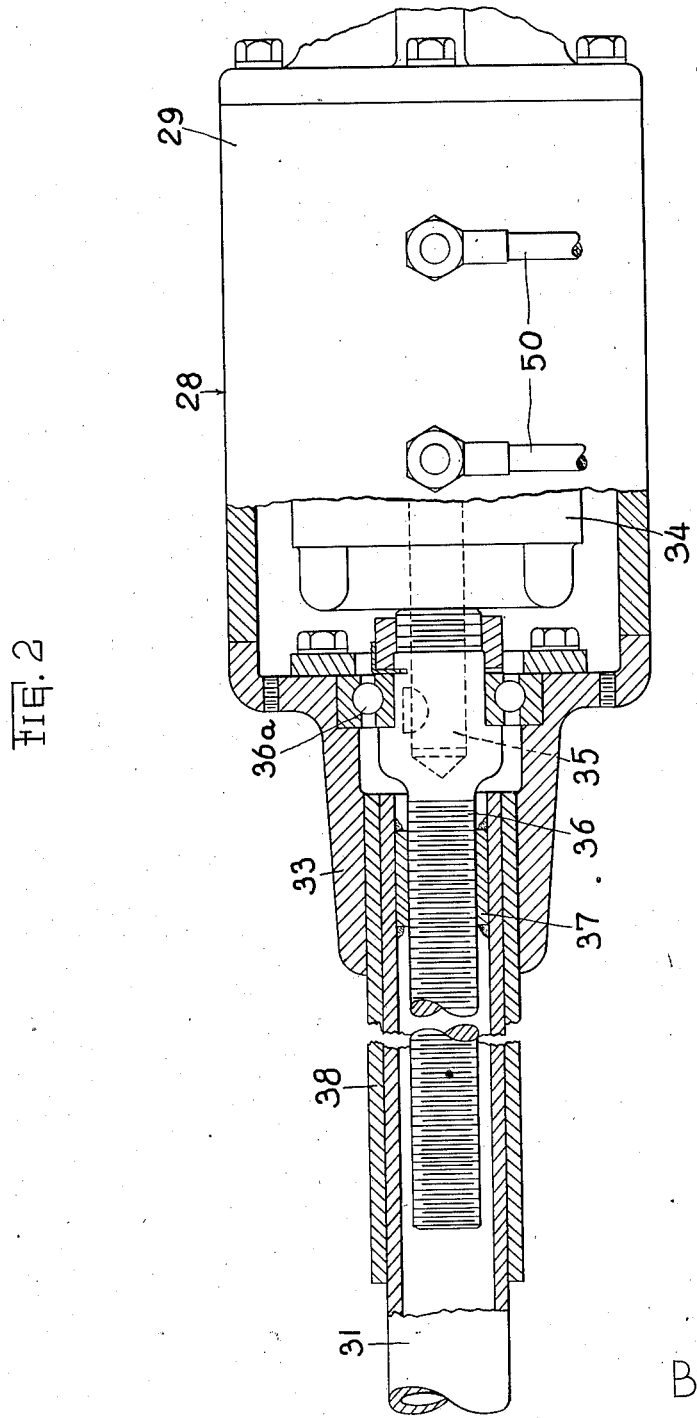

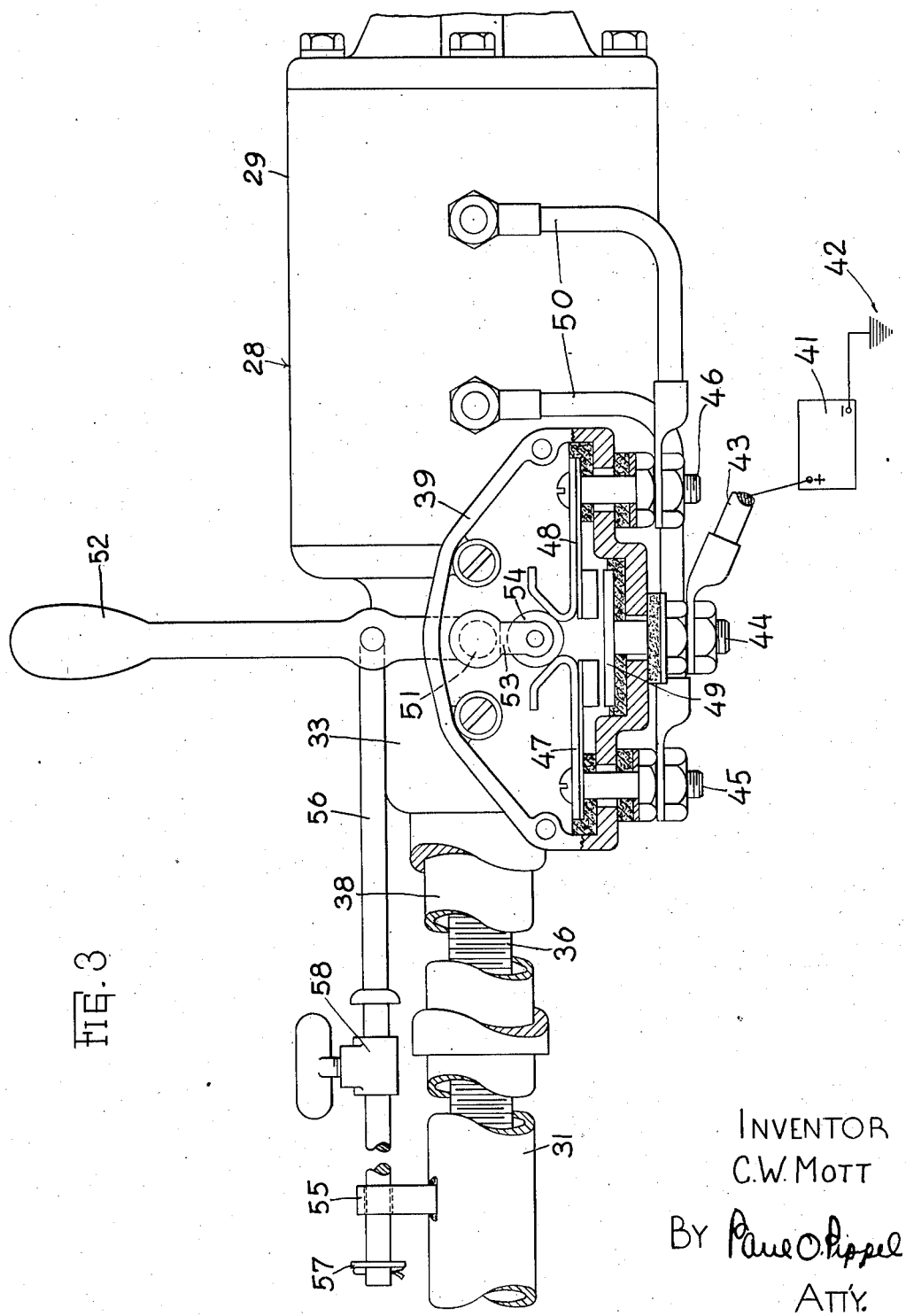

Patented Aug. 12, 1941

2,252,349

UNITED STATES PATENT OFFICE 2,252,349

AGRICULTURAL IMPLEMENT

Carl W. Mott, La Grange, Ill., assignor to International Harvester Company, a corporation of New Jersey Application January 13, 1940, Serial No. 313,751

5 Claims. (Cl. 97—50)

This invention relates to an agricultural implement, and more particularly to lift means for an implement of the tractor-mounted type.

The invention pertains especially to tractor-mounted implements in which the tractor has a main body carrying an implement rig, such as cultivator gangs or the like. Such implements generally consist of implement rigs mounted at the forward end of the tractor at each side of the body, and in some instances consist additionally of implement rigs mounted at the rear of the body. Lifting means of various types are adapted to be carried on the tractor for lifting the rigs.

The invention contemplates and has for its principal object the provision of improved lifting means for use in an implement arrangement such as referred to above.

An important object is to provide a lifting means including a rotating part and means for translating rotary motion to said part into vertical movement of the implement for raising and lowering the implement from and to ground position.

Another important object is to provide this lifting means in the form of an electro-powered lift means including an armature for driving the rotating part.

Another object is to provide control means connected to the implement and adapted to be actuated by the implement upon reaching certain predetermined positions.

Another object is to provide for fine adjustment of the height of the implement by means of cooperation between the control member and a rotatable screw member.

And, another object is to provide an improved and simplified arrangement for the purposes described.

Briefly and specifically these and other important objects are achieved in one preferred form of the invention wherein the improved lifting means is employed in connection with a tractor having a narrow longitudinal body at the forward end of which is carried an implement adapted to be moved vertically from lowered to raised position. An electric motor is carried at the rear of the tractor and includes an armature driving a rotatable screw means associated with a screw portion of a lifting member connected to the implement. A control member is provided within convenient reach of an operator on the tractor's seat. The screw member provides for translating rotary motion of the armature to fore and aft longitudinal movement of the lifting member, which in turn is translated into vertical movement of the implement.

A more complete understanding of these and other desirable objects of the invention may be had from the following detailed description taken in conjunction with the accompanying sheets of drawings, in which:

Figure 1 is a side elevational view of a preferred type of tractor-mounted implement, including an improved lifting means;

Figure 2 is a longitudinal sectional view through part of the lifting motor and the connections between the lift member and the rotary screw member; and, Figure 3 is an elevational view, partly in section, of the control means for the lift means.

The tractor chosen for the purposes of illustration is of a well known type consisting of a narrow longitudinal body 5 carried at its rear end on a pair of drive wheels 6, only one of which is shown, driven by drive axles 7 enclosed in axle housings 8. The forward end of the tractor is appropriately supported on a steerable front truck 9 including a vertical housing portion 10 enclosing steering mechanism, not shown, by which the front wheels may be steered through the medium of a steering wheel 11 located at the rear of the tractor in proximity to an operator's station or seat 12. The tractor includes the general hood construction arranged between the front vertical housing 10 and the rear portion of the tractor.

The forward portion of the body includes a forwardly extending supporting structure 13 including a transversely extending beam 14. A bracket 15 is carried by the beam 14 and pivotally carries a rearwardly and downwardly extending link 16, at the lower end of which is disposed a rearwardly extending implement beam 17. This beam is shown, for the purposes of illustration, as including a cultivator shovel 18. The beam 14 includes a vertical bracket 19 on which is pivoted, on a horizontal axis, an upwardly and rearwardly extending arm 20. The upper portion of the arm includes a bracket portion 21, to which is connected in the usual manner a lifting link 22 connected to an upstanding plate or bracket 23. The beam 14 includes rigidly thereon an upstanding bracket 24, to which is pivotally connected one end of a second link 25. The other end of the link 25 is pivotally connected to the plate 23. This arrangement is but one of a number of conventional types for providing for vertical movement of the implement from lowered or ground position to raised position.

The rear axle housing 8, at one side of the tractor body, carries an upwardly and forwardly extending support 26, to the forward end of which is rigidly attached an upstanding member 27. A lifting means in the form of an electric motor 28 is associated with the support 26, having a rear portion of its housing 29 pivoted at 30 on the upstanding member 27. The motor 28 is associated with a forwardly extending lift member 31, the forward end of which is connected at 32 to the upstanding lift arm 20. The arrangement between the motor 28 and the lift member 31 will now be set forth.

As best shown in Figure 2, the motor housing 29 includes a forwardly extending sleeve portion 33. An armature 34 is appropriately journaled in the housing 29 and includes a forwardly extending armature shaft 35 suitably keyed to a coaxial, forwardly extending screw member 36. The connection between the member 36 and the armature 34 is such that both are appropriately journaled in the housing by an anti-friction bearing 36a. The rearward portion of the lift member 31 is formed as a sleeve and loosely encircles the threaded portion of the screw member 36. This sleeve portion includes a threaded member 37 rigidly carried by the member 31 and engaging the threaded member 36. It will thus be seen that rotation of the threaded member 36 causes movement of the member 31 longitudinally of the tractor.

The sleeve portion 33 of the housing 29 rigidly carries a forwardly extending sleeve 38 which encircles and supports the rearward portion of the member 31. The sleeve 38 is of sufficient length to encircle and support the member 31, regardless of the forward or rearward movement of the latter.

The control means for the motor 28 is best shown in Figure 3. The motor housing 29 includes a secondary housing 39 normally covered by a cover plate 40. Figure 3 illustrates this construction with the cover plate 40 removed. The motor is appropriately connected to a source of electric energy, illustrated diagrammatically as a battery 41, suitably grounded, as at 42, and connected, as at 43, to a contact post 44 carried by the housing 39. This housing includes a second post 45 at the forward side of the post 44, and a third post 46 at the rearward side of the post 44. The post 45 carries at its upper end a rearwardly extending contact arm 47. The post 46 carries a forwardly extending, similar arm 48. These arms are arranged normally in spaced relation above a contact face 49 carried at the upper end of the post 44. Each of the posts 45 and 46 is suitably connected by leads 50 to the field of the motor 28. The motor is of the reversible type, and the control means provided therefor is adapted to control the direction of rotation of the motor at the will of the tractor operator. The housing 39 pivotally carries on a transverse rockshaft 51 an upstanding lever 52. The rock-shaft 51 carries at its enclosed end within the housing 39 a downwardly extending arm 53 provided with a roller 54. It will thus be seen that the lever 52 may be moved from its neutral position, as shown, to either a forward or rearward position, thus optionally engaging either of the contact arms 47 or 48 with the contact face 49 of the post 44.

An important feature of the invention is the provision of means for automatically controlling the rotation of the motor 28 according to the vertical position of the implement. The lifting member 31, as best shown in Figure 3, includes rigidly thereon an upstanding ear 55 provided with an opening receiving a control rod 56. The rod 56 is provided at the forward side of the ear 55 with a stop 57, and at the rearward side of the ear with an adjustable stop 58. The rod is pivotally connected at its rear end with the control lever 52. It will be appreciated from an examination of Figure 1 that, with the implement in its furthest downward position, the stop 58 engages the ear 55, thus depressing the control lever 52 in a neutral position to cut off energy to the motor 28. Similarly, when the implement has reached its ultimate lifted position, the ear 55 engages the stop 57 to move the lever 52 again to neutral position. In the particular instance illustrated, rearward movement of the lever 52 engages the contact 47 with the contact 49 of the post 44, thus causing the armature 34 to rotate the screw member 36 to raise the implement. Movement of the lever 52 to its forwardmost position engages the contacts 48 and 49 to reverse the armature 34 to lower the implement.

An important feature of the invention is the provision of a lifting means by which the vertical positioning of the implement may be readily regulated. The cooperation between the screw member 36 and the lifting member 31 provides for very slight fore or aft movement of the member 31, resulting in slight vertical movement of the implement. Accordingly the depth of the implement may be adjusted by means of the motor 28. Certain other features of greater or lesser importance will, of course, be apparent to those skilled in the art.

As previously mentioned, only a preferred embodiment of the invention has been illustrated and described. It will be understood, of course, that numerous modifications and alterations may be made in this preferred construction without departing from the spirit and scope of the invention as defined in the appended claims.

What is claimed is:

1. In a machine of the class described, including an implement frame, and an implement carried on the frame for vertical movement from lowered to raised position, the combination with the implement of lifting and lowering means therefor, comprising a reversible, rotary electromotor carried on the frame rotatable in one direction to raise the implement and rotatable in another direction to lower the implement, a source of electric energy connected to the motor, a control switch having forward, neutral, and reverse positions, lifting connections between the motor and the implement including means for translating rotary motion of the motor to vertical movement of the implement, and means connected between the implement and the switch for moving the switch from forward or reverse to neutral position when the implement has reached lifted or lowered position.

2. In a tractor-mounted implement in which the tractor includes a longitudinal body, and an implement carried by the tractor for vertical movement from lowered to raised position, the combination with the implement of lifting and lowering means therefor comprising an electromotor including a housing, and an armature rotatable on an axis longitudinally of the tractor body, lifting and lowering connections for the implement including a member mounted for fore and aft movement longitudinally of the tractor, and screw means coaxial with and driven by the armature for moving said member fore and aft to lift and lower the implement.

3. In an agricultural implement including an implement frame and an implement carried thereby for vertical movement from lowered to raised position, the combination with the implement of lift means carried on the frame and comprising a housing, a rotatable screw member journaled in the housing on a generally horizontal axis, a lift member having a screw sleeve encircling and engaging the screw member and connected to the implement, and a supporting sleeve carried by the housing and encircling and supporting the lift member screw sleeve.

4. In an agricultural implement including an implement frame and an implement carried thereby for vertical movement from lowered to raised position, the combination with the implement of electro-powered lift means carried on the frame and comprising a housing, a rotatable armature, a screw member journaled in the housing and rotatable by the armature, a lift member having a screw portion coaxially engaging the screw member and connected to the implement; and a support carried by the housing and supporting the lift member.

5. In a tractor-mounted agricultural implement in which the tractor includes a longitudinal body, and an implement carried at one end of the body for movement to and from ground position generally about an axis transversely of the body, the combination with the implement of lift means therefor carried on the body and spaced longitudinally from the implement, said means including an electric motor having a screw member rotatable on a longitudinal axis, and a lift member connected at one end to the implement and having its other end provided with a screw portion coaxially engaging the screw member.

CARL W. MOTT.